US012183061B2

(12) United States Patent
Capellier

(10) Patent No.: US 12,183,061 B2
(45) Date of Patent: Dec. 31, 2024

(54) IDENTIFYING NEW CLASSES OF OBJECTS IN ENVIRONMENTS OF VEHICLES

(71) Applicant: Motional AD LLC, Boston, MA (US)

(72) Inventor: Edouard Francois Marc Capellier, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/988,188

(22) Filed: Nov. 16, 2022

(65) Prior Publication Data

US 2024/0127579 A1 Apr. 18, 2024

Related U.S. Application Data

(60) Provisional application No. 63/416,869, filed on Oct. 17, 2022.

(51) Int. Cl.
G06V 10/764 (2022.01)
G05D 1/00 (2006.01)
G06V 10/762 (2022.01)
G06V 10/774 (2022.01)
G06V 20/70 (2022.01)

(52) U.S. Cl.
CPC ......... *G06V 10/764* (2022.01); *G05D 1/0088* (2013.01); *G05D 1/0214* (2013.01); *G05D 1/0274* (2013.01); *G06V 10/762* (2022.01); *G06V 10/774* (2022.01); *G06V 20/70* (2022.01); *G06V 2201/08* (2022.01)

(58) Field of Classification Search
None
See application file for complete search history.

(56) References Cited

U.S. PATENT DOCUMENTS

| 2019/0187720 | A1 | 6/2019 | Fowe |
| 2021/0012116 | A1 | 1/2021 | Urtasun et al. |
| 2021/0192748 | A1 | 6/2021 | Morales Morales et al. |
| 2023/0057604 | A1* | 2/2023 | Urtasun ................ G06N 3/045 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Leon Flores
(74) *Attorney, Agent, or Firm* — Fish & Richardson P.C.

(57) ABSTRACT

A method may include applying a first machine learning model trained to perform an open-set detection by at least identifying, based at least on image data indicative of one or more objects present in at least one environment in which one or more vehicles operate, at least one new class of objects. A dataset including a plurality of classes of objects may be updated to include the at least one new class of objects. In some cases, the dataset may be further updated to include a label associated with the at least one new class of objects. A second machine learning model may be trained, or in some cases updated, based at least on the updated dataset including the at least one new class of objects. Related systems and computer program products are also provided.

30 Claims, 13 Drawing Sheets

(56) References Cited

OTHER PUBLICATIONS

Cao et al., "Open-World Semi-Supervised Learning," revised Jan. 25, 2022, arXiv:2102.03526, 19 pages.
Cen et al., "Open-set 3D Object Detection," submitted on Dec. 2, 2021, arXiv:2112.01135, 10 pages.
Chang et al., "ShapeNet: An Information-Rich 3D Model Repository," Dec. 9, 2015, arXiv:1512.03012, 11 pages.
Ester et al., "A Density-Based Algorithm for Discovering Clusters in Large Spatial Databases with Noise, " KDD, 1996, 96(34):226-231.
Lu, "A survey on Bayesian inference for Gaussian mixture model," submitted Aug. 20, 2021, arXiv:2108.11753, 123 pages.
Shah, "Clustering and Querying Images From Unknown Classes Using Metric Learning," Stanford University, 2017, 8 pages.
Wong et al., "Identifying Unknown Instances for Autonomous Driving," 3rd Conference on Robot Learning (CoRL 2019), Osaka, Japan, Oct. 30-Nov. 1, 2019; Proceedings of the Conference on Robot Learning, PMLR, 2020, 100:384-393, 10 pages.
Zhang et al., "Large-scale multi-label classification using unknown streaming images," Pattern Recognition, 2020, 99:107100, 10 pages.
International Search Report and Written Opinion in International Appln. No. PCT/US2023/035039, mailed on Dec. 21, 2023, 14 pages.
Liu et al., "Self-Initiated Open World Learning for Autonomous AI Agents", CoRR, Submitted on Feb. 11, 2022, arXiv:2110.11385v2, 6 pages.
Zheng et al., "Towards Open-Set Object Detection and Discovery", 2022 IEEE/CVF Conference on Computer Vision and Pattern Recognition Workshops (CVPRW),Jun. 19, 2022, pp. 3960-3969.

\* cited by examiner

IDENTIFYING NEW CLASSES OF OBJECTS IN ENVIRONMENTS OF VEHICLES

CROSS REFERENCE TO RELATED APPLICATION

This application claims priority to U.S. Provisional Application No. 63/416,869, entitled "IDENTIFYING NEW CLASSES OF OBJECTS IN ENVIRONMENTS OF VEHICLES" and filed on Oct. 17, 2022, the disclosure of which is incorporated herein by reference in its entirety.

BACKGROUND

An autonomous vehicle can navigate along a sequence of trajectories with minimal to no human input. To safely navigate the vehicle along a selected path, the vehicle may rely on objects in an environment around the vehicle. Classes of objects in some instances are known, such as cars, traffic lights, or pedestrians, while in other instances are unknown. Objects in known classes can be accounted for in determining the trajectory, but unknown objects can make it difficult to determine a safe trajectory. Identifying objects from unknown classes remains a challenging yet crucial task.

DETAILED DESCRIPTION

Figure 1:
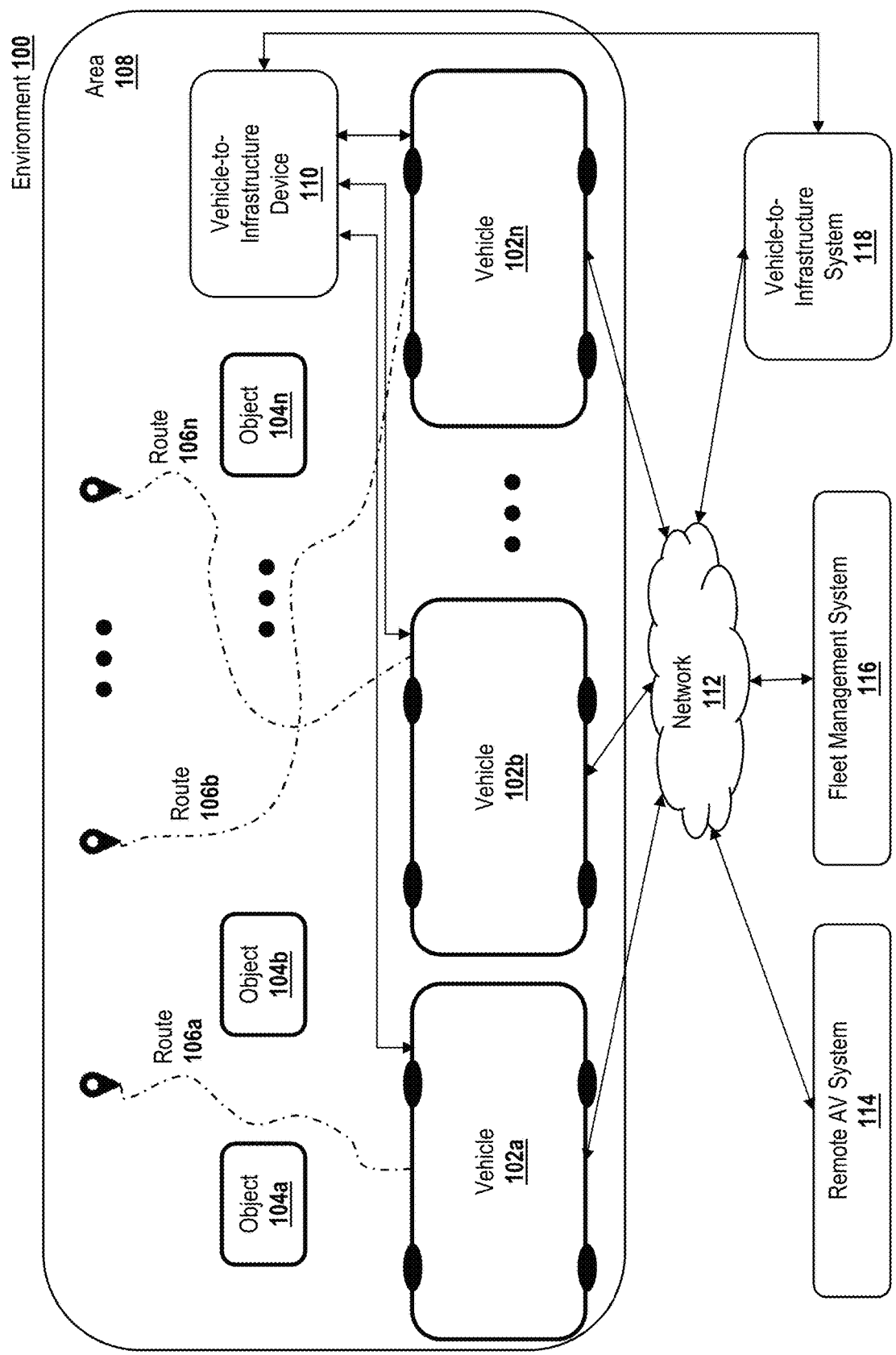
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

A vehicle (such as an autonomous vehicle) can navigate along a sequence of trajectories that can each be based at least in part on objects in an environment around the vehicle. Classes of objects in some instances are known, such as cars, traffic lights, or pedestrians, while in other instances are unknown. Objects in known classes can be accounted for in determining the trajectory, but unknown objects can make it difficult to determine a safe trajectory, such as by not knowing whether unknown objects are stationary objects or are movable objects that may move at a certain velocity and/or in a certain direction. Analyzing images of the environment around the vehicle using open-set detection analysis can allow unknown objects to be classified automatically, thus allowing trajectories to be more safely determined. Images of environments around multiple vehicles can be used in the open-set detection analysis, which may help unknown objects be classified since more data including more objects and/or from more geographic locations can be analyzed.

Some of the advantages of these techniques include allowing objects to be automatically classified, for example, by being assigned a label, which obviates the need for expert annotations, which can be particularly resource intensive in autonomous vehicle applications where images from unfamiliar environments are being gathered constantly. Object classes may be unknown for a variety of reasons, such as by typically only being found in a particular geographic location such as a particular city, state, or country, by being relatively low in overall number so are not often present in environments around vehicles, by being a newly developed technology or a newly engineered design recently introduced into environments around vehicles, and/or by being unknown for another reason. Automatically classifying objects may thus help keep up with technological developments and engineering designs and/or may allow geographical trends to be identified. The complexity of a particular geographic location may thus be able to be known before any vehicles are introduced into the particular geographic location because at least one geographic trend of the location can already be known and thus be available for consideration in determining vehicle trajectories. Existing vehicles can be configured to generate image data using at least one sensor, so the open-set detection analysis can take advantage of existing capabilities of the vehicle by using the generated image data that is already available and able to be transmitted to a remote server that can perform the open-set detection analysis. The server can receive image data from multiple vehicles, which may make the open-set detection analysis more effective since more images and/or images from more locations than one vehicle alone could provide can be analyzed by the server to identify unknown classes of objects. In other instances, a vehicle itself can perform open-set detection analysis using image data generated by the vehicle.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
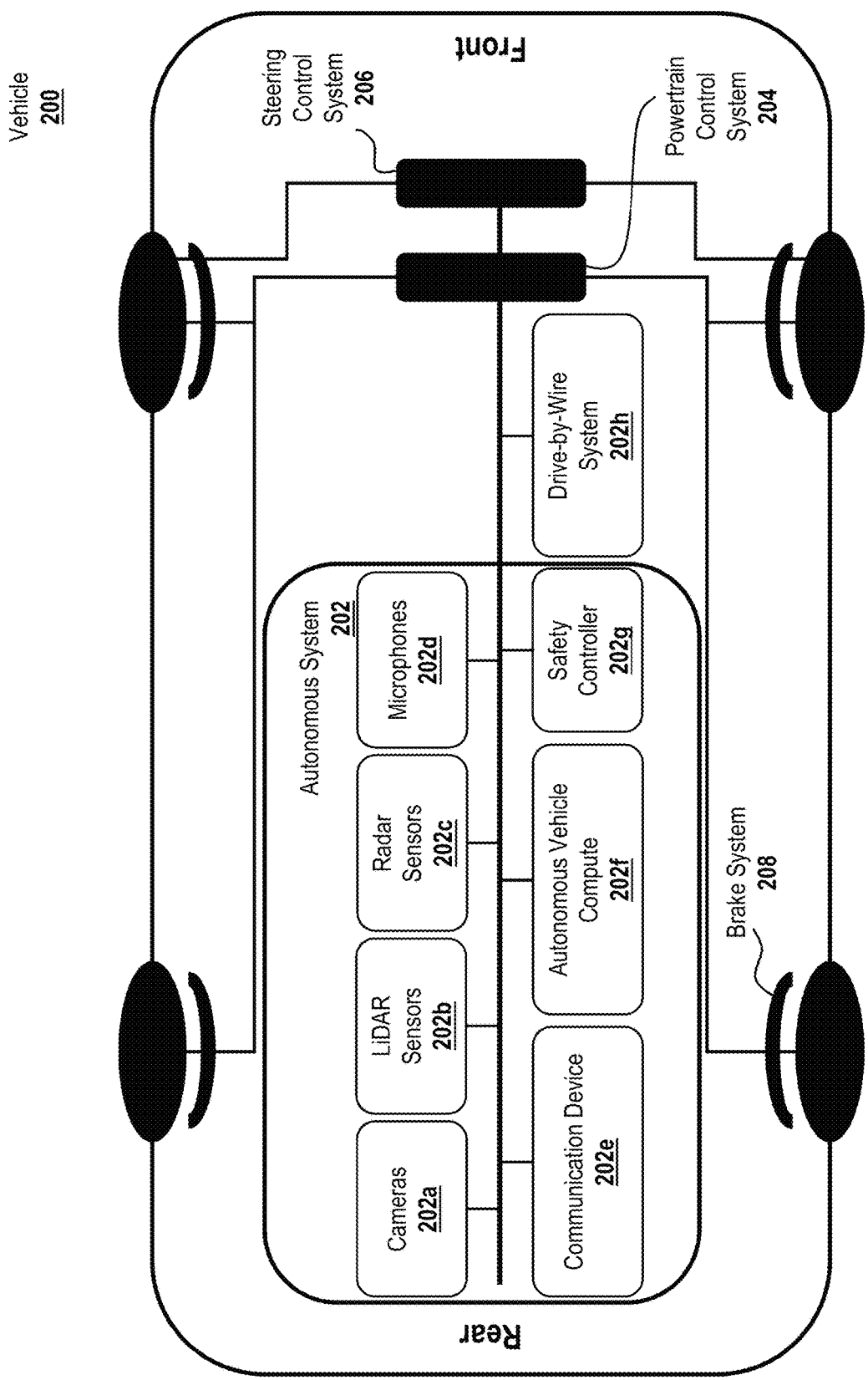
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
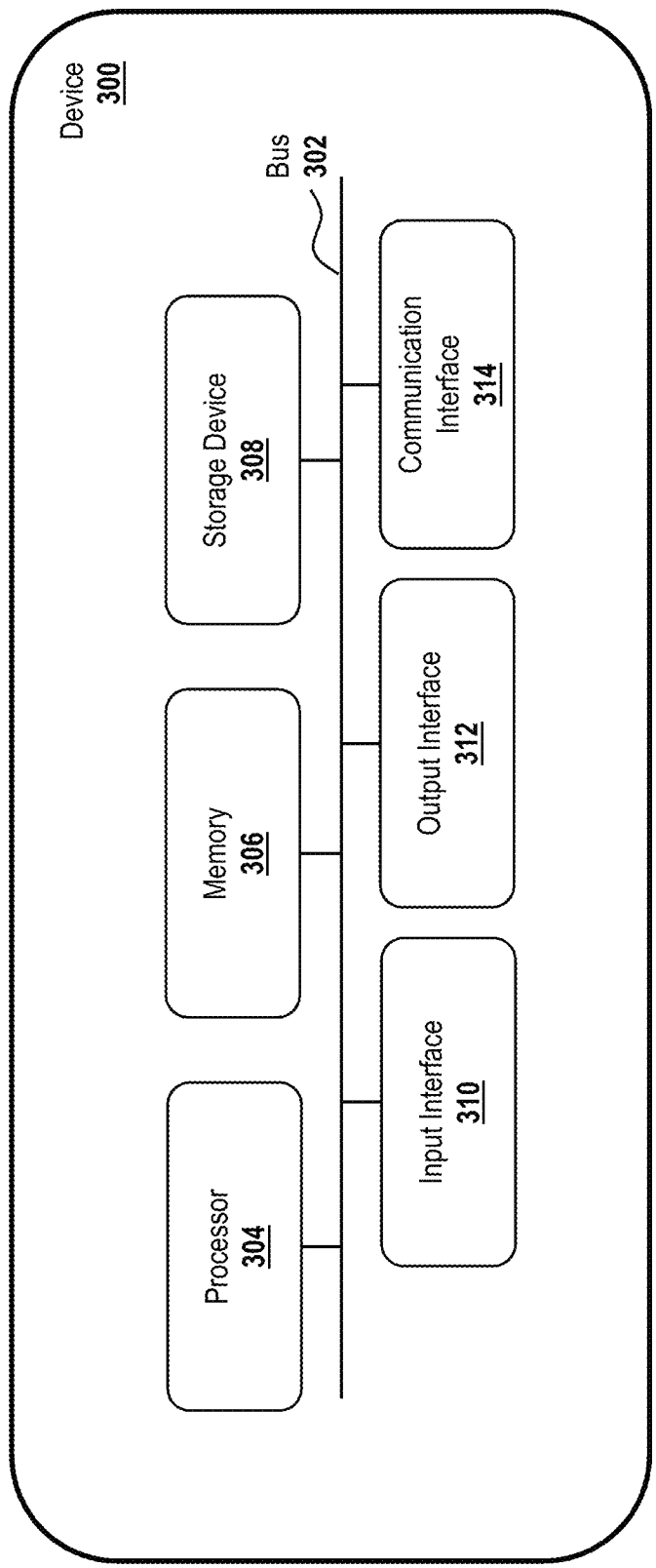
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of V2I device 110 (e.g., at least one device of a system of V2I device 110), at least one device of AV system 114 (e.g., at least one device of a system of AV system 114), at least one device of fleet management system 116 (e.g., at least one device of a system of fleet management system 116), at least one device of V2I system 118 (e.g., at least one device of a system of V2I system 118), at least one device of cameras 202a (e.g., at least one device of a system of cameras 202a), at least one device of LiDAR sensors 202b (e.g., at least one device of a system of LiDAR sensors 202b), at least one device of radar sensors 202c (e.g., at least one device of a system of radar sensors 202c), at least one device of microphones 202d (e.g., at least one device of a system of microphones 202d), at least one device of communication device 202e (e.g., at least one device of a system of communication device 202e), at least one device of autonomous vehicle compute 202f (e.g., at least one device of a system of autonomous vehicle compute 202f), at least one device of safety controller 202g (e.g., at least one device of a system of safety controller 202g), at least one device of DBW system 202h (e.g., at least one device of a system of DBW system 202h), at least one device of powertrain control system 204 (e.g., at least one device of a system of powertrain control system 204), at least one device of steering control system 206 (e.g., at least one device of a system of steering control system 206), at least one device of brake system 208 (e.g., at least one device of a system of brake system 208), at least one device of platform sensors (e.g., at least one device of a system of platform sensors), and/or one or more devices of network 112 (e.g., one or more devices of a system of network 112). In some embodiments, one or more devices of vehicles 102 (e.g., one or more devices of a system of vehicles 102), one or more devices of V2I device 110 (e.g., one or more devices of a system of V2I device 110), one or more devices of AV system 114 (e.g., one or more devices of a system of AV system 114), one or more devices of fleet management system 116 (e.g., one or more devices of a system of fleet management system 116), one or more devices of V2I system 118 (e.g., one or more devices of a system of V2I system 118), one or more devices of cameras 202a (e.g., one or more devices of a system of cameras 202a), one or more devices of LiDAR sensors 202b (e.g., one or more devices of a system of LiDAR sensors 202b), one or more devices of radar sensors 202c (e.g., one or more devices of a system of radar sensors 202c), one or more devices of microphones 202d (e.g., one or more devices of a system of microphones 202d), one or more devices of communication device 202e (e.g., one or more devices of a system of communication device 202e), one or more devices of autonomous vehicle compute 202f (e.g., one or more devices of a system of autonomous vehicle compute 202f), one or more devices of safety controller 202g (e.g., one or more devices of a system of safety controller 202g), one or more devices of DBW system 202h (e.g., one or more devices of a system of DBW system 202h), one or more devices of powertrain control system 204 (e.g., one or more devices of a system of powertrain control system 204), one or more devices of steering control system 206 (e.g., one or more devices of a system of steering control system 206), one or more devices of brake system 208 (e.g., one or more devices of a system of brake system 208), one or more devices of platform sensors (e.g., one or more devices of a system of platform sensors), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
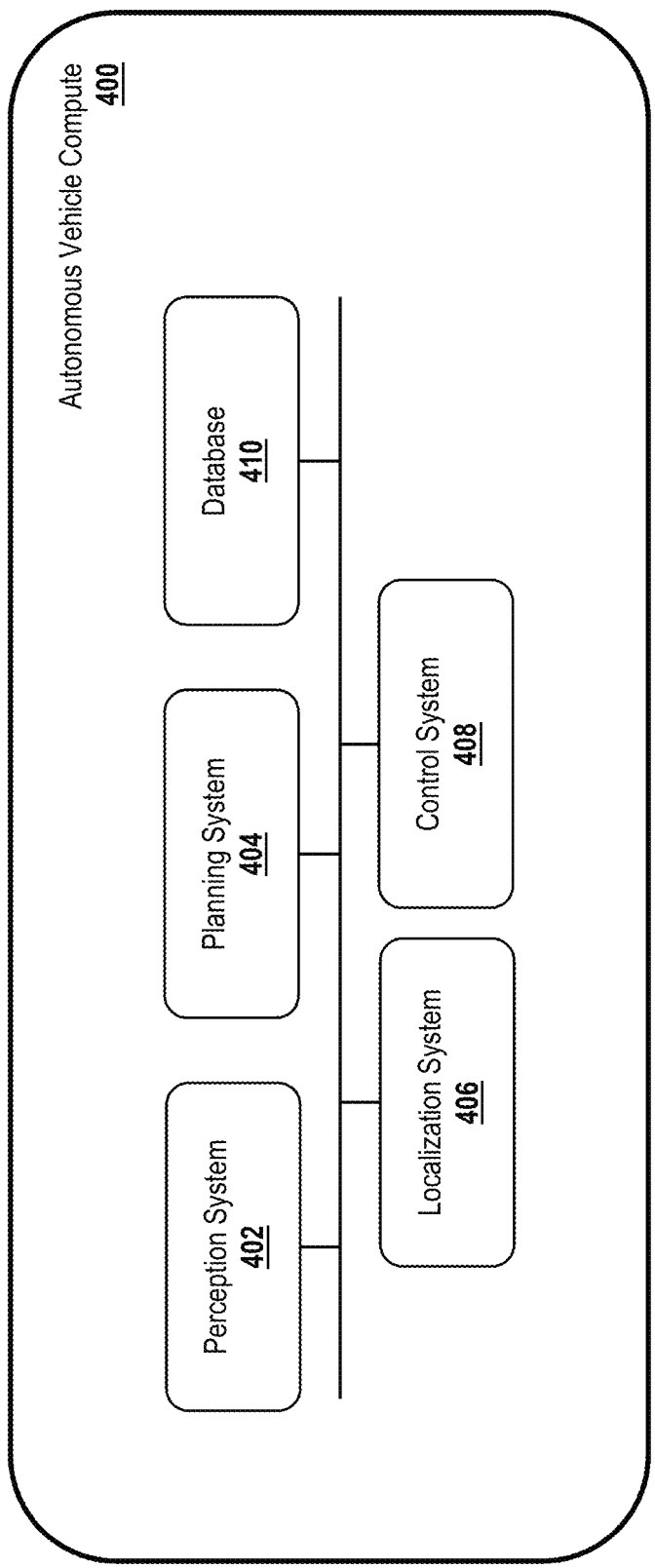
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a country, and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
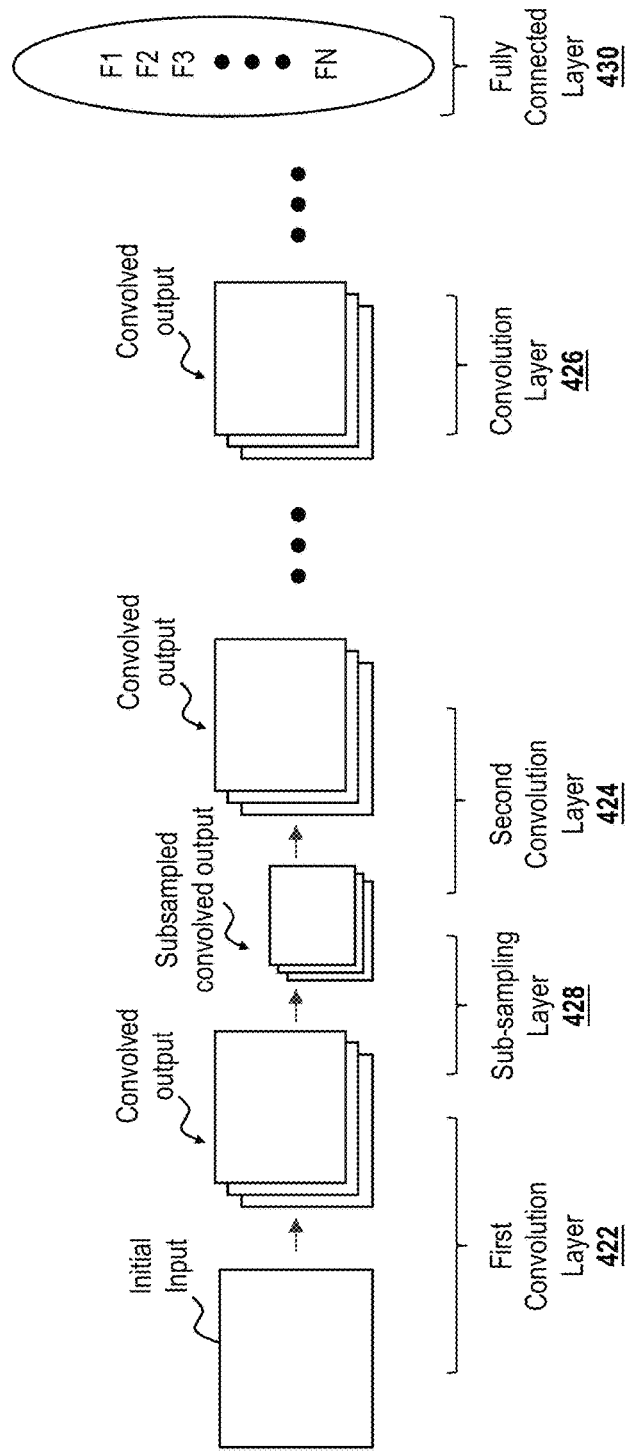
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408.

While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
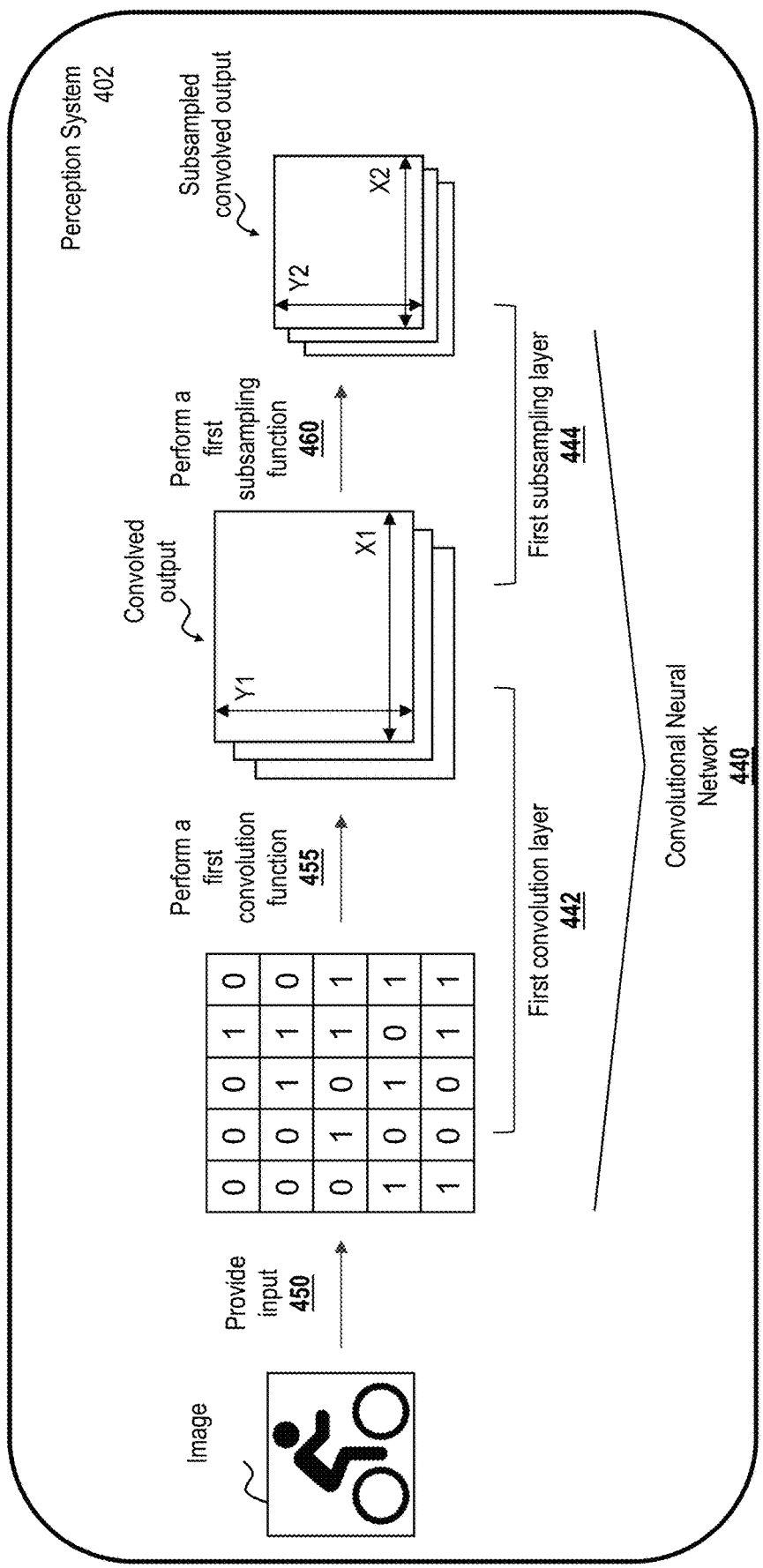
FIGS. 4C and 4D are a diagram illustrating example operation of a CNN.
Figure 4D:
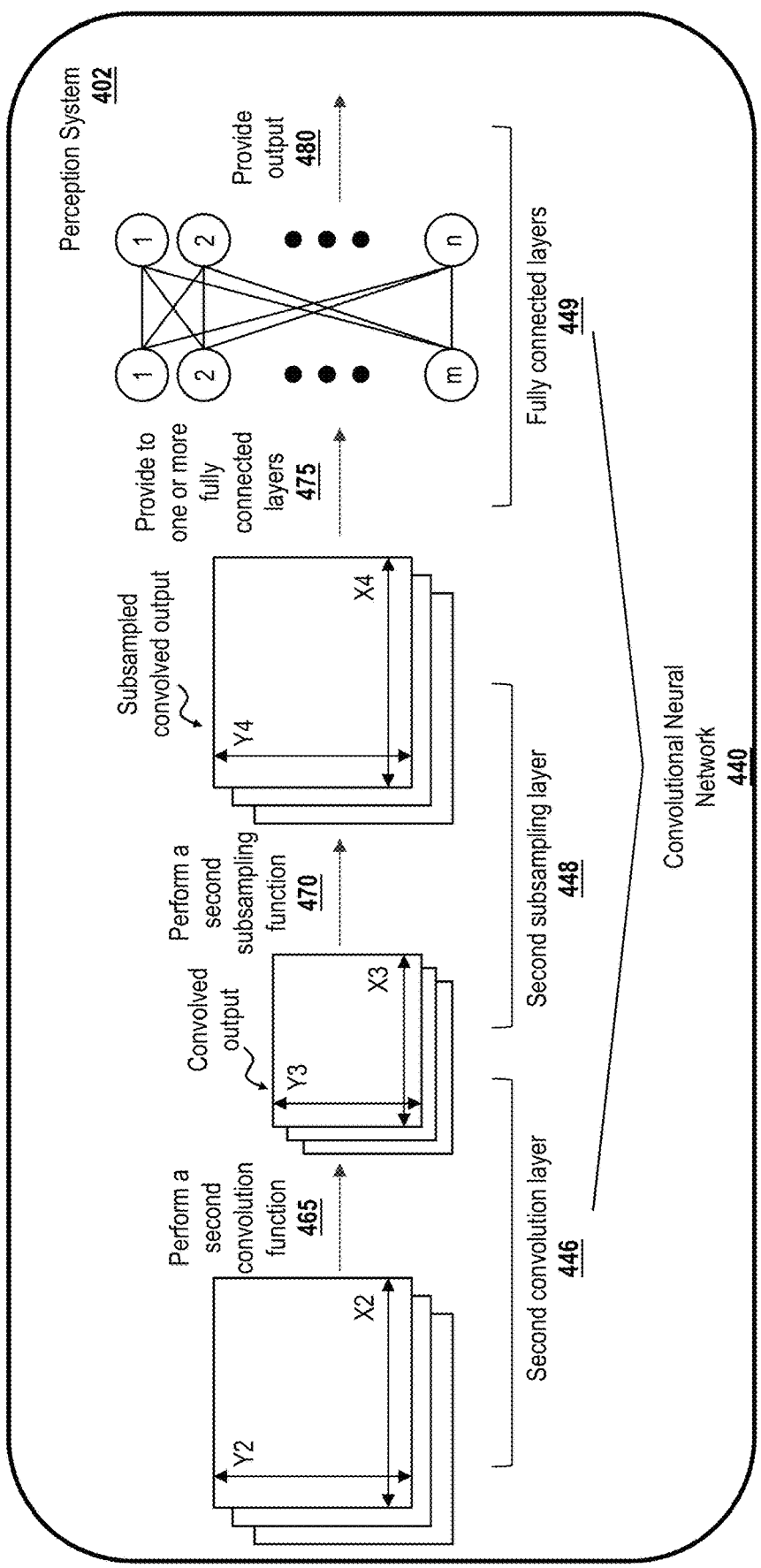

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
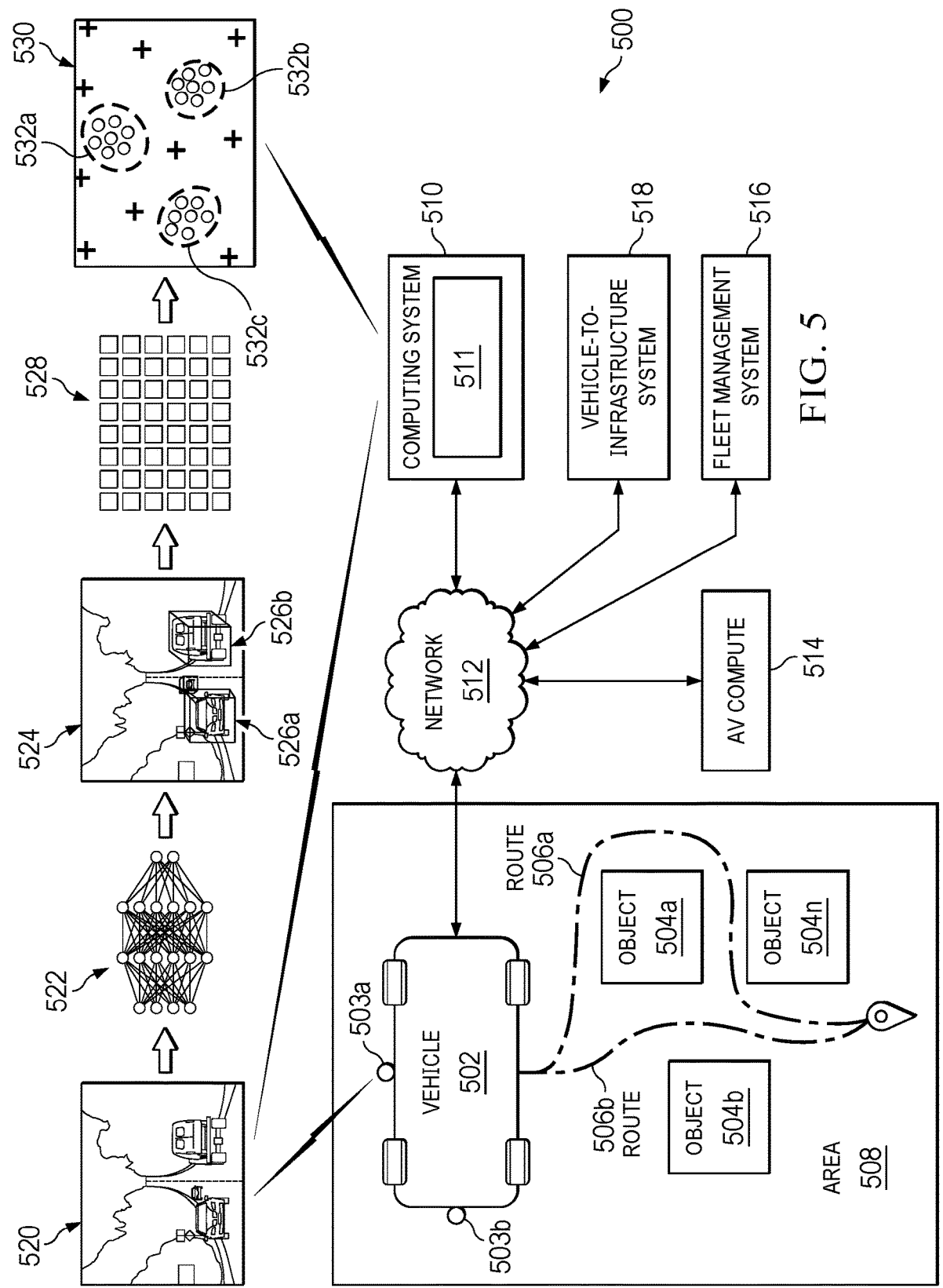
FIG. 5 is an example environment in which a vehicle including one or more components of an autonomous system can be implemented.

Referring now to FIG. 5, illustrated is example environment 500 in which vehicles that include autonomous systems, as well as vehicles that do not, are operated. As illustrated, environment 500 includes a vehicle 502, objects 504a-504n, routes 506a, 506b, area 508, a computing system 510, network 512, autonomous vehicle (AV) compute 514, fleet management system 516, and V2I system 518. The vehicle 502, the computing system 510, network 512, autonomous vehicle (AV) compute 514, fleet management system 516, and V2I system 518 interconnect (e.g., establish a connection to communicate and/or the like) via wired connections, wireless connections, or a combination of wired or wireless connections. In some embodiments, objects 504a-504n interconnect with the vehicle 502, computing system 510, network 512, autonomous vehicle (AV)

compute 514, fleet management system 516, and vehicle-to-infrastructure (V2I) system 518 via wired connections, wireless connections, or a combination of wired or wireless connections.

Vehicle 502 can include a device (autonomous vehicle) configured to transport goods and/or people on a route 506a within the area 508. In some embodiments, vehicle 502 is the same as, or similar to, vehicles 102a, ... 102n, described with reference to FIG. 1 and vehicles 200, described with reference to FIG. 2. The vehicle 502 includes one or more sensors 503a, 503b (e.g., cameras 202a, sensors 202b, 202c, and/or microphones 202d described with reference to FIG. 2) that are configured to detect at least a portion of the objects 504a-504n within the area 508 and generate (3D image) data of the area 508. The vehicle 502 can be configured to be in communication with computing system 510, via network 512, to transmit the (3D image) data of the area 508, generated by the sensors 503a, 503b, to the computing system 510. In some implementations, the vehicle 502 collects data of the area 508 in an offline fashion (storing the data in a storage component of the vehicle, such as a hard drive) and the vehicle 502 can transmit the data to computing system 510, after the vehicles complete a data collection session The vehicle 502 can also be configured to be in communication AV compute 514, fleet management system 516, and/or V2I system 518 via network 512.

The objects 504a-504n (referred to individually as object 504 and collectively as objects 504) include, for example, at least one vehicle, at least one pedestrian, at least one cyclist, at least one structure (e.g., a building, a sign, a fire hydrant, etc.), and/or the like. The objects 504a-504n can include known objects (previously identified and classified objects) and unknown objects that do not match with any previously identified objects. Each object 504 is stationary (e.g., located at a fixed location fora period of time) or mobile (e.g., having a velocity and associated with at least one trajectory). In some embodiments, objects 504 are associated with corresponding locations in area 508.

The routes 506a, 506b (referred to individually as route 506 and collectively as routes 506) are each associated with (e.g., prescribe) a sequence of actions (also known as a trajectory) connecting states along which an AV can navigate. Route 506a can be an initial (current) route and route 506b can be an updated route (e.g., route modified to avoid an object 504a). Each route 506 includes an initial state (e.g., a state that corresponds to a first spatiotemporal location, velocity, and/or the like), a current state, and ends at a final goal state (e.g., a state that corresponds to a second spatiotemporal location that is different from the first spatiotemporal location) or goal region (e.g. a subspace of acceptable states (e.g., terminal states)). In some embodiments, the current state includes a location, at which the vehicle 502 is located at a current time. In some embodiments, routes 506a, 506b include a plurality of acceptable state sequences (e.g., a plurality of spatiotemporal location sequences), the plurality of state sequences associated with (e.g., defining) a plurality of trajectories, which can be updated in real time to avoid objects 504a-504n and successfully reach the final goal state or region (e.g., without collisions with any of the objects 504a-504n that can exist and/or move within the area 508).

The area 508 includes a physical area (e.g., a geographic region) within which vehicles 502 can navigate. In an example, area 508 includes at least one state (e.g., a country, a province, an individual state of a plurality of states included in a country, etc.), at least one portion of a state, at least one city, at least one portion of a city, etc. In some embodiments, area 508 includes at least one named thoroughfare (referred to herein as a "road") such as a highway, an interstate highway, a parkway, a city street, etc. Additionally, or alternatively, in some examples area 508 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 502). In an example, a road includes at least one lane associated with (e.g., identified based on) at least one lane marking. The area 508 can be defined to include the region around an initial route 506a and potential alternative routes 506b or can include an area that can be detected at any time by the sensors 503a, 503b of the vehicle 502.

The computing system 510 is configured to be in communication with vehicles 502 and/or V2I infrastructure system 518. The computing system 510 includes at least one or more processors 511 configured to process (3D image) data 520 received from the vehicle 502. The processors 511 can be configured to execute a detection process 522 (as described with reference to FIGS. 6A-6C) to generate an updated data set 524 including predicted object attributes (location, dimension, . . . ) 526a, 526b The processors 511 can be configured to differentiate between known and unknown objects and to generate embeddings (feature vectors) 528 for the detected unknown objects. The processors 511 can generate a classification of the objects 530 including new classes of objects 532a, 532b that correspond to unknown objects with similar embeddings. The detections can be stored and accumulated with the respective embeddings, to a new dataset. The computing system 510 can transmit the classification of objects 530 to the AV compute 514, fleet management system 516, and/or V2I system 518 via network 512 (e.g., network 112 described with reference to FIG. 1).

The AV compute 514 includes at least one device configured to be in communication with vehicles 502, computing system 510, network 512, fleet management system 516, and/or V2I system 518 via network 512. The AV compute 514 (AV compute 400 described with reference to FIG. 4A) receives data including the classification of objects 530 in the area 508, and data associated with a destination. The AV compute 514 generates data associated with an updated route (e.g., routes 106) for the vehicle 502 to safely travel along toward a destination and to prevent a collision between the vehicle 502 and object 504a. In some embodiments, AV compute 514 periodically or continuously receives data from computing system 510 (e.g., data associated with the classification of physical objects, described above) and AV compute 514 updates the at least one trajectory or generates at least one different trajectory based on the data generated by AV compute 514. The AV compute 514 can share the updated route 506b with the fleet management system 516. The fleet management system 516 includes at least one device configured to be in communication with vehicle 502 and one or more additional vehicles to synchronize the updated route 506 of the vehicle 502 with additional planned routes of the other vehicles in proximity to the vehicle 502.

In some embodiments, V2I system 518 includes at least one device configured to be in communication with vehicles 502, V2I device 510, remote AV system 514, and/or fleet management system 516 via network 512. In some examples, V2I system 518 is configured to be in communication with V2I device 510 via a connection different from network 512. In some embodiments, V2I system 518 includes a server, a group of servers, and/or other like devices. In some embodiments, V2I system 518 is associated with a municipality or a private institution (e.g., a private institution that maintains V2I device 510 and/or the like).

The number and arrangement of elements illustrated in FIG. 5 are provided as an example. There can be additional elements, fewer elements, different elements, and/or differently arranged elements, than those illustrated in FIG. 5. Additionally, or alternatively, at least one element of environment 500 can perform one or more functions described as being performed by at least one different element of FIG. 5. Additionally, or alternatively, at least one set of elements of environment 500 can perform one or more functions described as being performed by at least one different set of elements of environment 500.

Referring now to FIGS. 6A-6D, illustrated are flowcharts of examples of processes for identifying new classes of objects in environments of vehicle. In some embodiments, one or more of the operations described with respect to processes 600, 620, 640, 660 are performed (e.g., completely, partially, and/or the like) by an autonomous system or device or group of devices, as described with reference to FIGS. 1-5. For example, one or more of the operations described with respect to any of the processes 600, 620, 640, 660 are performed (e.g., completely, partially, sequentially, nonsequentially, and/or the like) by the perception system 402, the planning system 404, and/or the control system 408 of the autonomous vehicle computer 400 of a vehicle (e.g., vehicle 102a, 102b, 102n described with reference to FIG. 1 or vehicle 200 described with reference to FIG. 2). Additionally, or alternatively, in some embodiments, one or more operations described with respect to the processes 600, 620, 640, 660 are performed (e.g., completely, partially, sequentially, nonsequentially, and/or the like) by another device or group of devices separate from or including the autonomous vehicle computer 400.

Figure 6A:
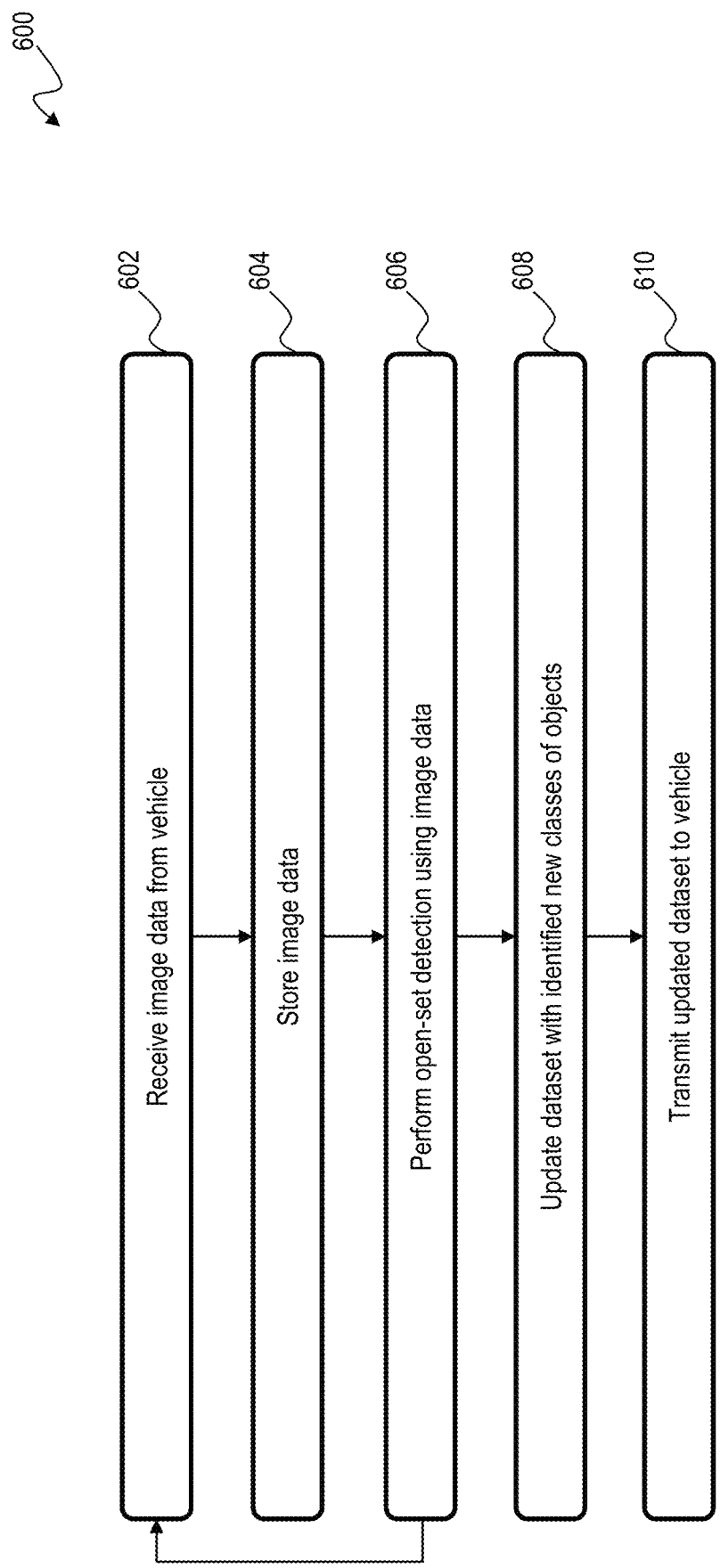
FIGS. 6A-6D are flowcharts illustrating examples of processes for identifying new classes of objects in environments of vehicles.

Referring now to process 600 illustrated by FIG. 6A, at 602, image data is received from one or more sensors attached to at least one vehicle (e.g., autonomous vehicle following a set trajectory) within a three-dimensional (3D) physical environment at a geographic location at a given time. The image data includes at least one of image data generated by at least one device (e.g., camera, 3D sensors, etc.) of the at least one vehicle, RGB (red, green blue) image data, 3D (LIDAR, RADAR) data, and map data. The physical environment includes multiple objects that at a set time, are at a certain distance away from the vehicle. Vehicles can be configured to generate image data at a set frequency.

At 604, the received image data is stored to enable processing of the image data at any point in time, including in real time. In some implementations, the data is stored by a storage component included in the vehicle or can be transmitted to a remote server that can store and process data remotely from the vehicle.

At 606, open set detection is performed, by a detector (processor of the vehicle or processor of a remote computing system), using the image data. The detector can perform an open-set detection analysis to classify the objects within the environment, which can be used to update the trajectory of the vehicle. The detector can be trained on a dataset of three-dimensional scans with labels of known classes of obstacles or objects (e.g., known classes such as cars, pedestrians, bicycles, etc.). The training can be performed using a dataset stored by the vehicle or the training can correlate multiple detections from different dates and locations, if the detection is performed by the remote computing system (during an off-line session). The detectors can be configured to predict object attributes including object location, object dimension, object type, and other object characteristics. In some implementations, after completion of open set detection, the process 600 returns to receiving new image data, repeating the collection and processing of image data until a set threshold (e.g., a specific volume of image data) is met.

In some implementations, the detection includes continuous (re)training using at least one machine learning model (e.g., at least one multilayer perceptron (MLP), at least one convolutional neural network (CNN), at least one recurrent neural network (RNN), at least one autoencoder, at least one transformer, and/or the like). In some examples, the detector implements at least one machine learning model alone or in combination with one or more of the above-noted systems described with reference to FIGS. 1-5 (e.g., computing system 510 described with reference to FIG. 5, perception system 402, planning system 404, localization system 406, and/or control system 408 described with reference to FIGS. 4A-4D). In some implementations, the detection implements at least one machine learning model as part of a pipeline (e.g., a pipeline for identifying one or more objects located in an environment and/or the like).

At 608, a dataset is updated with references of any identified new classes of objects (e.g., previously unknown classes such as 3-wheeled vehicles, trolleys, etc.). At 610, a portion of the updated dataset can be transmitted to the at least one vehicle to adjust (e.g., modify) the trajectory and, potentially, the velocity of the vehicle, based on the objects identified within the image data to prevent a collision with the identified objects. For example, a list of detected objects in the scene can be transmitted to the at least one vehicle to adjust the trajectory and, potentially, the velocity of the vehicle relative to the detected objects.

Figure 6B:
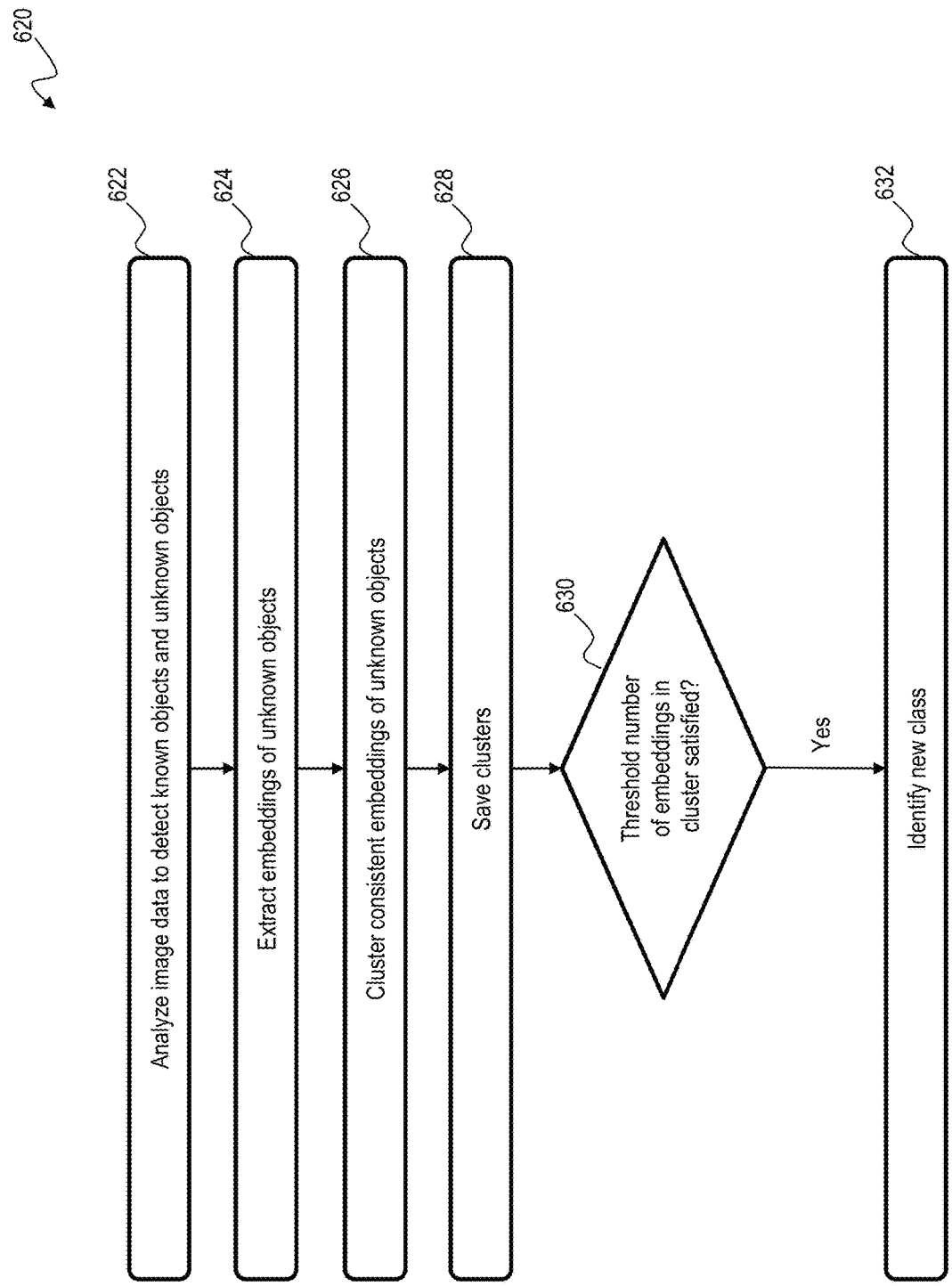

Referring now to process 620 illustrated by FIG. 6B, at 622, image data is analyzed to detect known objects and unknown objects. The amount of new classes and discovered unknown obstacles can be good indicators of the complexity of a new scene or city, which can be determined before actually deploying an autonomous vehicle through a new environment. For example, environments (e.g., cities, towns, villages, highways) that include various and numerous unknown obstacles, with regard to what is initially present in the reference dataset, can be different from the environments, in which the reference dataset was acquired. Analyzing images of the environment around one or more sensors or cameras (that can be attached to a vehicle) using open-set detection analysis can allow unknown objects to be classified automatically, thus allowing trajectories to be more safely determined. Object classes may be unknown for a variety of reasons. For example, some object classes could only be found in a particular geographic location, such as a particular city, state, or country, or the unknown object classes could appear relatively infrequent in environments around vehicles. Object classes may also be unknown due to an appearance of a newly developed technology or a newly engineered design, recently introduced into environments around vehicles, and/or by being unknown for another reason.

At 624, embeddings (e.g., an embedding vector or a vector of object features or attributes) of unknown objects are extracted. Each embedding vector represents various aspects of the corresponding object of content located at a respective location within an area around the vehicle. The embeddings can include a semantic description of the identified features (attributes) of the objects that can be added to the image data to form a multimodal representation of the image. The embeddings can be predicted for each point in the image data. Points in the image data that do not correspond to instances of a known class are assigned as unknown objects (potential obstacles). The detected unknown objects (potential obstacles) can be represented by an embedding vector. The embedding vector of detected unknown objects can either be obtained from a geometrical analysis, the open-set detector itself, or an additional helper neural network.

At 626, consistent embedding of unknown objects are clustered. Clustering different embeddings into consistent clusters can be based on algorithms that do not assume the number of clusters, such as density-based spatial clustering of applications with noise (DBSCAN) or by using Bayesian Gaussian Mixture models. Clustering different embeddings of all the detected unknown objects into consistent clusters can be used to deduce missing class labels in the training set that was used to train the open-set detector.

At 628, clusters of consistent embedding of unknown objects are saved for future use. At 630, it is determined whether a set threshold number of embeddings in a cluster is satisfied. The set threshold number of embeddings can be selected to ensure process efficiency and a quality level of the new class identification.

At 632, a new class is automatically identified based on the embeddings included in the cluster. In some implementations, the newly discovered classes are used to retrain a closed-set detector on the existent labels and on the automatically discovered classes. The retrain process allows to extract higher level semantic information for previously unknown obstacles. The higher level semantic information is extracted by adding the new obstacles that the system discovered to the reference dataset, with respective automatic label, training a detector on the new classes, automatically adding the new classes to the reference dataset, and labelling the new classes in the reference dataset. In some implementations, automatic annotation of new classes of objects obviate the need for expert annotations, which can be particularly resource intensive in autonomous vehicle applications where new images from unfamiliar environments are being gathered constantly. In some implementations, identifying the new class includes annotating the newly classified objects to assign a text label (e.g., umbrella, trolley, building, art piece, etc.) to the newly discovered classes. The classified objects can be automatically annotated with a text identifier, thus obviating the typical expert annotation required to determine a label for classified objects. In some implementations, automatically classifying objects can include training a neural network to classify objects, on a large dataset of objects.

Automatically classifying objects may help with remaining consistent with technological developments, variable engineering designs, and/or may allow geographical trends to be identified. The complexity of a particular geographic location may thus be able to be known before any vehicles are introduced into the particular geographic location because at least one geographic trend of the location can already be known and thus be available for consideration in determining vehicle trajectories.

Figure 6C:
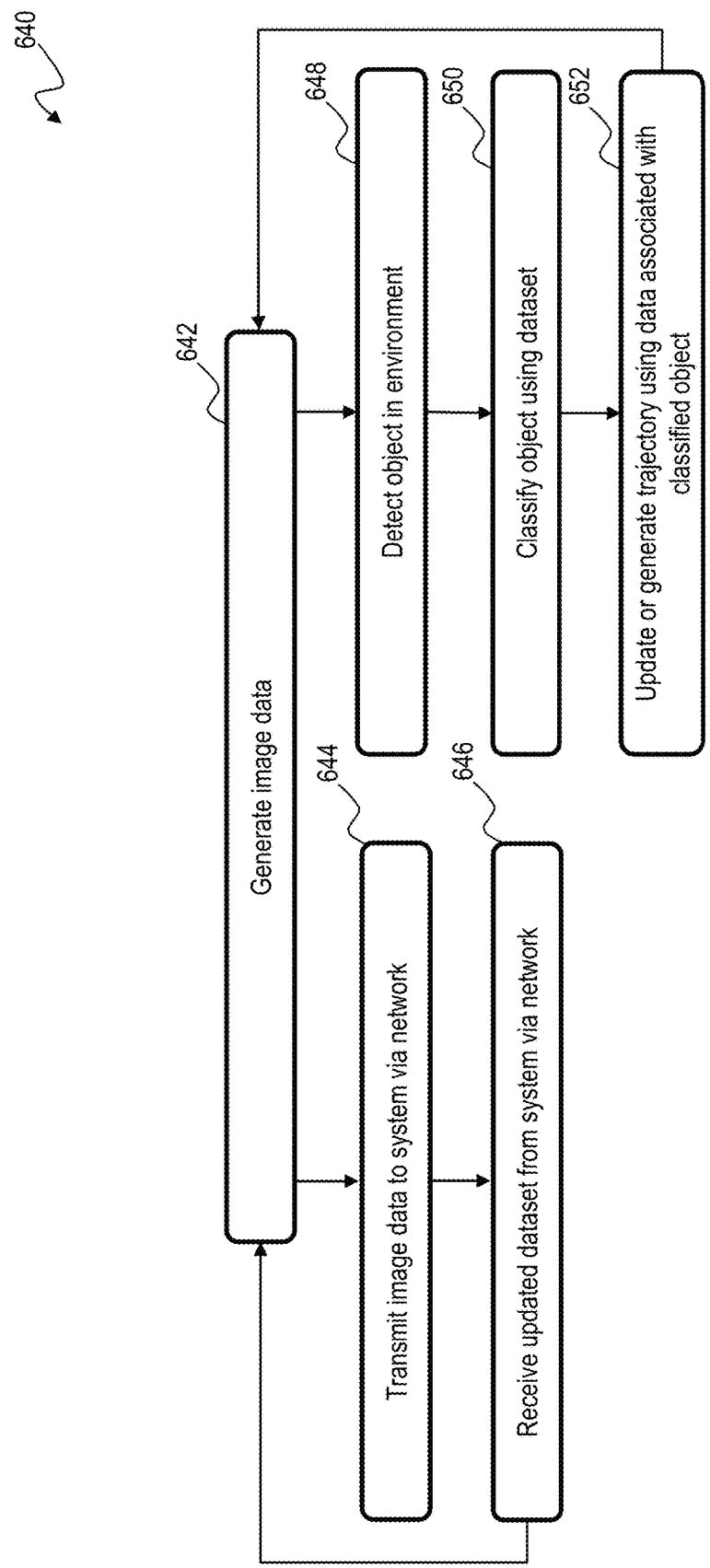

Referring now to process 640 illustrated by FIG. 6C, at 642 image data is generated. At 644, the image data is transmitted to a system via a network. For example, the image data can be transmitted, by multiple vehicles, to a server, which may be configured to perform open-set detection analysis more effective since more images and/or images from more locations than one vehicle alone could provide can be analyzed by the server to identify unknown classes of objects.

At 646, the updated dataset is received from the system via the network. From 646, process 640 can return to 642 to generate a new image. At 648, an object is detected in the environment. In some implementations, the physical object is detected by a perception system configured to process (image) data associated with at least one object included in the environment.

At 650, the object is classified using a reference dataset. At 652, a trajectory is updated or generated using data associated with the classified object. For example, a trajectory of a vehicle within the physical space may be determined based on the aligned target point cloud. For example, a path along which a vehicle (e.g., vehicle 102 shown in FIG. 1, vehicle 200 shown in FIG. 2, etc.) may travel in order to navigate within the physical space (e.g., the city block in which a street intersection, a traffic light, a stop sign, a pedestrian, and multiple buildings may be located) such that the vehicle accurately travels from one or more source locations to one or more destination locations, e.g., while avoiding collisions with other vehicles, pedestrians, buildings, and/or the like. From 652, process 640 can return to 642 to generate a new image or to generate a signal to trigger acquisition of a new image.

Figure 6D:
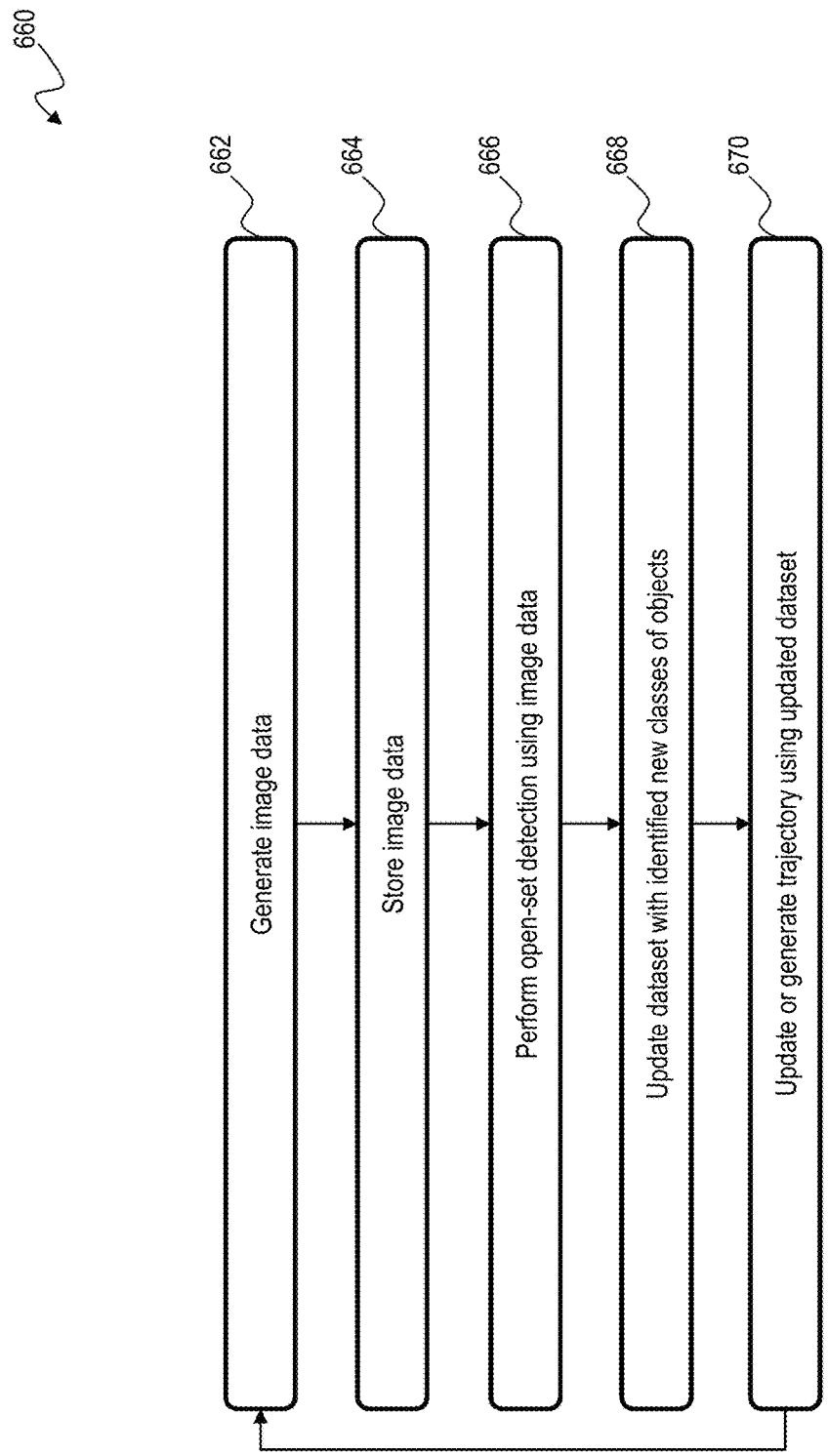

Referring now to process 660 illustrated by FIG. 6D, at 662, image data is generated. For example, the image data can be generated by a vehicle configured to perform open-set detection analysis using the image data generated by the vehicle.

At 664, the generated image data is stored. At 666, open-set detection is performed using the image data, as described with reference to FIG. 6C. At 668, a reference dataset is updated with any identified new classes of objects, as described with reference to FIG. 6A. At 670, a trajectory is updated or generated using the updated dataset, as described with reference to FIG. 6C. From 670, process 660 can return to 662 to generate a new image.

Figure 7:
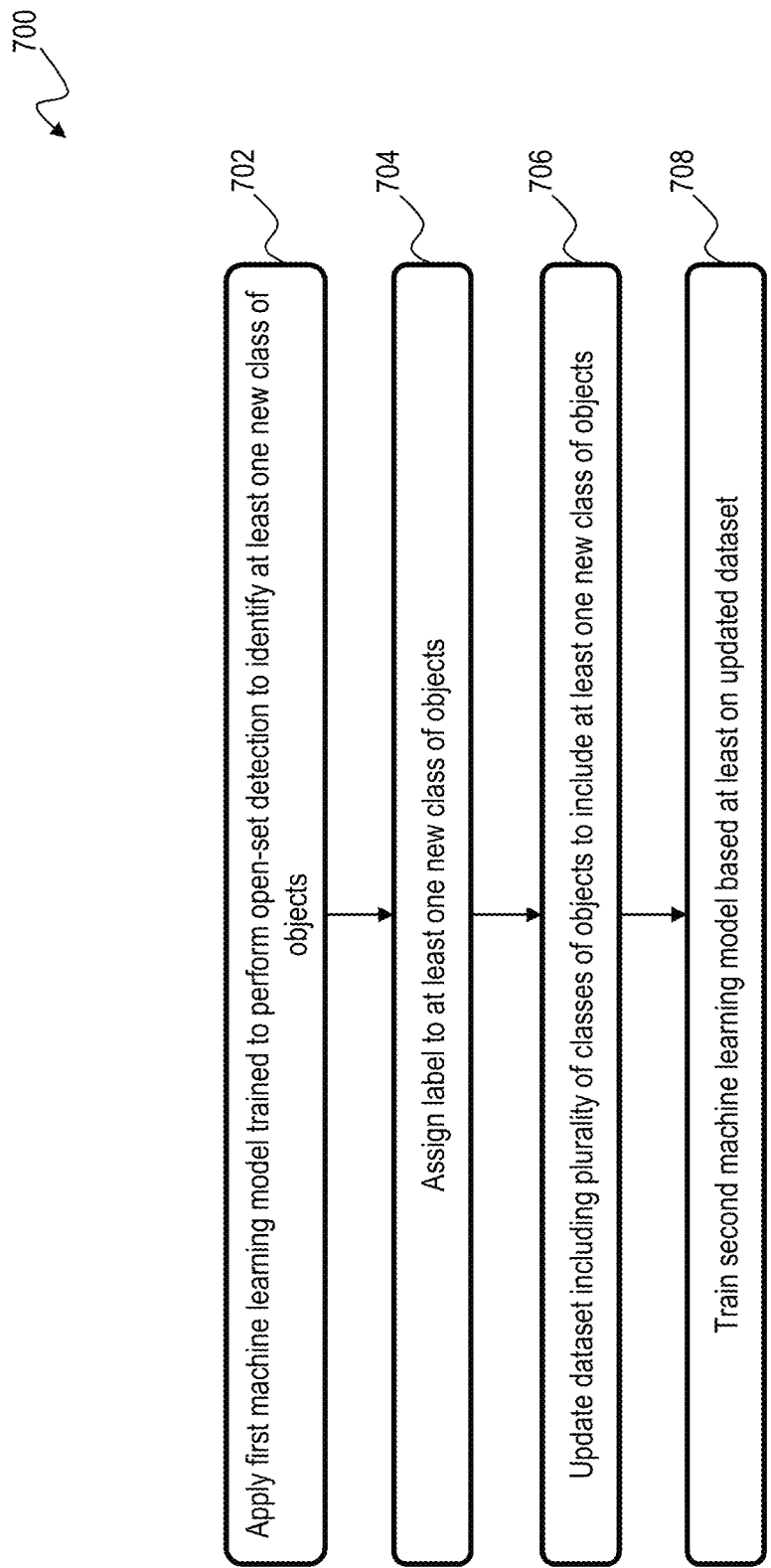
FIG. 7 is a flowchart illustrating another example of a process for identifying new classes of objects the environment in which a vehicle operates.

FIG. 7 depicts a flowchart illustrating an example of a process 700 for identifying new classes of objects present in an environment in which a vehicle operates. In some embodiments, one or more of the operations described with respect to the process 700 may be performed, in part or in whole, by an autonomous system or device or group of devices, as described with reference to FIGS. 1-5. For example, one or more of the operations described with respect to the process 700 may be performed (e.g., completely, partially, sequentially, non-sequentially, and/or the like) by the perception system 402, the planning system 404, and/or the control system 408 of the autonomous vehicle computer 400 of a vehicle (e.g., vehicle 102a, 102b, 102n described with reference to FIG. 1 or vehicle 200 described with reference to FIG. 2). Additionally, or alternatively, in some embodiments, one or more operations described with respect to the process 700 may be performed (e.g., completely, partially, sequentially, non-sequentially, and/or the like) by another device or group of devices separate from or including the autonomous vehicle computer 400.

At 702, a first machine learning model trained to perform an open-set detection may be applied to identify at least one new class of objects. In some example embodiments, the first machine learning model may be an open-set detector implemented using one or more of a multilayer perceptron (MLP), a convolutional neural network (CNN), a recurrent neural network (RNN), an autoencoder, a transformer, and/or or the like. The first machine learning model may identify, based at least on image data indicative of one or more objects present in at least one environment in which one or more vehicles operate, at least one new class of objects. For example, in some cases, the first machine learning model may detect at least one unknown object in the image data before extracting an embedding for each of the at least one unknown objects. The embeddings may then be clustered to form one or more clusters, with each cluster having a threshold quantity of embeddings being identified as corresponding to a new class of objects. In some cases, the one or more clusters may be generated by applying a clustering algorithm that does not assume a particular quantity of clusters including, for example, density-based spatial clustering of applications with noise (DBSCAN), Bayesian Gaussian Mixture models, and/or the like.

At 704, a label may be assigned to the at least one new class of objects. In some example embodiments, the at least one new class of objects identified by the first machine learning model performing the open-set detection may be annotated with a label identifying the at least one new class of objects. In some cases, the label assigned to the at least one new class of objects may be identified automatically, for example, by applying a separate machine learning model. Alternatively and/or additionally, the label assigned to the at least one new class of objects may be specified by one or more user inputs.

At 706, a dataset including a plurality of objects may be updated to include the at least one new class of objects. In some example embodiments, the dataset may be a training set and/or a validation set containing annotated images of previously known classes of objects. Accordingly, upon identifying the at least one new class of objects, the dataset may be updated to include the image data associated with the at least one new class of objects. In some cases, the dataset may be updated to include the image data along with the annotations identifying the at least one new class of object depicted therein. In instances where the first machine learning model is trained to predict object attributes based on one or more of a location and/or a dimension of the object, the dataset may be further updated to include at least one object attribute of the at least one new class of objects.

At 708, a second machine learning model may be trained based at least on the updated dataset. In some example embodiments, the second machine learning model may be a closed-set detector implemented using one or more of a multilayer perceptron (MLP), a convolutional neural network (CNN), a recurrent neural network (RNN), an autoencoder, a transformer, and/or the like. In some cases, the second machine learning model may have been trained based on the dataset without the at least one new class of objects before the second machine learning model is updated (or retrained) based on the dataset updated to include the at least one new class of objects. Doing so may increase the performance of the machine learning model, particularly its ability to correctly classify objects that are in the at least one new class of objects when the vehicle encounters such objects in its environment. In some cases, once trained, the second machine learning model may be applied to identify, based at least one or more images of an environment in which the vehicle is operating, one or more objects that are present in the environment in which the vehicle is operating. Alternatively and/or additionally, the trained second machine learning model may be applied to determine, based at least on the one or more images of the environment in which the vehicle is operating, the trajectory for the vehicle.

In some cases, the second machine learning model be deployed, at least partially, at the vehicle (e.g., an autonomous vehicle such as vehicles 102, the vehicle 200, and/or the like). For example, the second machine learning model may implement at least a portion of the perception system 402 of the autonomous vehicle compute 400, in which case the second machine learning model may be trained to identify objects present in an environment in which the vehicle (e.g., an autonomous vehicle such as vehicles 102, the vehicle 200, and/or the like) is operating. Alternatively and/or additionally, the second machine learning model may implement at least a portion of the planning system 404 of the autonomous vehicle compute 400, in which case the second machine learning model may be trained to determine a trajectory for the vehicle (e.g., an autonomous vehicle such as vehicles 102, the vehicle 200, and/or the like). As noted, the trajectory for the vehicle may include a sequence of actions connecting states (e.g., various spatiotemporal locations) along which the vehicle can navigate. In some cases, it should be appreciated that the trajectory of the vehicle may be determined based at least on the objects that are identified as present in the environment as well as, in the case of mobile objects, the predicted tracks of the objects. Moreover, in some cases, the trajectory of the vehicle may also be determined based at least on map data (e.g., one or more two-dimensional and three-dimensional maps) of the environment in which the vehicle is operating.

In some example embodiments, instead of and/or in addition to being deployed at the vehicle (e.g., as a part of the perception system 402 and/or the planning system 404), the second machine learning model may also be deployed at a server (e.g., the remote AV system 114) that is in communication with the vehicle with a network (e.g., the network 112). In those cases, the objects identified by the second machine learning model and/or the trajectory determined by the second machine learning model may be sent to the vehicle via the network (e.g., the network 112).

According to some non-limiting embodiments or examples, provided is a method, comprising: performing, with at least one processor, open-set detection using image data indicative of images of at least one environment in which at least one vehicle is operated such that at least one new class of objects is identified; and updating, with the at least one processor, a dataset including a plurality of classes of objects with the identified at least one new class of objects such that a trajectory of the at least one vehicle can be determined using the updated dataset.

According to some non-limiting embodiments or examples, provided is a system, comprising: at least one processor, and at least one non-transitory storage media storing instructions that, when executed by the at least one processor, cause the at least one processor to perform operations comprising: performing, with at least one processor, open-set detection using image data indicative of images of at least one environment in which at least one vehicle is operated such that at least one new class of objects is identified; and updating, with the at least one processor, a dataset including a plurality of classes of objects with the identified at least one new class of objects such that a trajectory of the at least one vehicle can be determined using the updated dataset.

According to some non-limiting embodiments or examples, provided is at least one non-transitory computer-readable medium comprising one or more instructions that, when executed by at least one processor, cause the at least one processor to perform operations comprising: performing, with at least one processor, open-set detection using image data indicative of images of at least one environment in which at least one vehicle is operated such that at least one new class of objects is identified; and updating, with the at least one processor, a dataset including a plurality of classes of objects with the identified at least one new class of objects such that a trajectory of the at least one vehicle can be determined using the updated dataset.

Further non-limiting aspects or embodiments are set forth in the following numbered clauses:

Clause 1: A method, comprising: applying, using at least one processor, a first machine learning model trained to perform an open-set detection by at least identifying, based at least on image data indicative of one or more objects present in at least one environment in which one or more vehicles operate, at least one new class of objects; updating, using the at least one processor, a dataset comprising a plurality of classes of objects to include the at least one new class of objects; and training, using the at least one processor and based at least on the updated dataset, a second machine learning model to determine a trajectory for a vehicle.

Clause 2: The method of clause 1, wherein the first machine learning model further performs the open-set detection by at least: detecting, using the at least one processor, at least one unknown object in the image data, extracting, using the at least one processor, an embedding of each of the at least one unknown objects, clustering, using the at least one processor, the embedding in a cluster with at least one other embedding that is consistent with the embedding, and identifying, using the at least one processor, the cluster as a new class of objects if a threshold number of embeddings are in the cluster.

Clause 3: The method of any of clauses 1 to 2, further comprising: annotating, using the at least one processor, the at least one new class of objects by at least assigning a label to the at least one new class of objects.

Clause 4: The method of clause 3, wherein the label is determined automatically and/or based on one or more user inputs.

Clause 5: The method of any of clauses 1 to 4, further comprising: training, using the at least one processor, the second machine learning model based on the dataset without the at least one new class of objects; and updating, using the at least one processor, the trained second machine learning model based on the dataset including the at least one new class of objects.

Clause 6: The method of any of clauses to 1 to 5, wherein the first machine learning model is trained to predict object attributes based on one or more of a location and a dimension.

Clause 7: The method of clause 11, wherein the dataset is updated to include at least one object attributed associated with the at least one new class of objects.

Clause 8: The method of any of clauses 1 to 7, wherein the first machine learning model is an open set detector, and wherein the second machine learning model is a closed set detector.

Clause 9: The method of any of clauses 1 to 8, wherein at least one of the first machine learning model and the second machine learning model is a multilayer perceptron, a convolutional neural network, a recurrent neural network, a transformer, and/or an autoencoder.

Clause 10: The method of any of clauses 1 to 9, wherein the second machine learning model is deployed at a server in communication with the vehicle via a network, and wherein the trajectory for the vehicle is sent to the vehicle via the network.

Clause 11: The method of any of clauses 1 to 10, wherein the second machine learning model is deployed at the vehicle to determine, at the vehicle, the trajectory of the vehicle.

Clause 12: The method of any of clauses 1 to 11, further comprising: applying the trained second machine learning model to determine, based at least on one or more images of an environment in which the vehicle is operating, the trajectory for the vehicle.

Clause 13: The method of clause 12, wherein the image data is generated using at least one of a camera and a microphone at the vehicle.

Clause 14: The method of any of clauses 12 to 13, wherein the second machine learning model is further trained to determine the trajectory of the vehicle based on map data associated with the environment in which the vehicle is operating.

Clause 15: The method of any of clauses 1 to 14, wherein the plurality of classes of objects comprising the dataset includes one or more stationary objects and mobile objects.

Clause 16: The method of any of clauses 1 to 15, wherein the trajectory includes a sequence of actions navigated by the vehicle to travel from a first spatiotemporal location to a second spatiotemporal location.

Clause 17: A system, comprising: at least one computer-readable medium storing computer-executable instructions; and at least one processor, the at least one processor being configured to execute the computer executable instructions, the execution carrying out the method of any of clauses 1 to 16.

Clause 18: A non-transitory computer-readable storage medium storing instructions, which when executed by at least one data processor, result in operations comprising the method of any of clauses 1 to 16.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
applying, using at least one processor, a first machine learning model trained to perform an open-set detection by at least identifying, based at least on image data indicative of one or more objects present in at least one environment in which one or more vehicles operate, at least one new class of objects;
updating, using the at least one processor, a dataset comprising a plurality of classes of objects to comprise the at least one new class of objects identified by the first machine learning model; and
training, using the at least one processor and based at least on the updated dataset comprising the at least one new class of objects identified by the first machine learning model, a second machine learning model to determine a trajectory for a vehicle.

2. The method of claim 1, wherein the first machine learning model further performs the open-set detection by at least:
   detecting, using the at least one processor, at least one unknown object in the image data,
   extracting, using the at least one processor, an embedding of each of the at least one unknown objects,
   clustering, using the at least one processor, the embedding in a cluster with at least one other embedding that is consistent with the embedding, and
   identifying, using the at least one processor, the cluster as a new class of objects if a threshold number of embeddings are in the cluster.

3. The method of claim 1, further comprising:
   annotating, using the at least one processor, the at least one new class of objects by at least assigning a label to the at least one new class of objects.

4. The method of claim 3, wherein the label is determined automatically and/or based on one or more user inputs.

5. The method of claim 1, further comprising:
   training, using the at least one processor, the second machine learning model based on the dataset without the at least one new class of objects; and
   updating, using the at least one processor, the trained second machine learning model based on the dataset including the at least one new class of objects.

6. The method of claim 1, wherein the first machine learning model is trained to predict object attributes based on one or more of a location and a dimension.

7. The method of claim 6, wherein the dataset is updated to include at least one object attributed associated with the at least one new class of objects.

8. The method of claim 1, wherein the first machine learning model is an open set detector, and wherein the second machine learning model is a closed set detector.

9. The method of claim 1, wherein at least one of the first machine learning model and the second machine learning model is a multilayer perceptron, a convolutional neural network, a recurrent neural network, a transformer, and/or an autoencoder.

10. The method of claim 1, wherein the second machine learning model is deployed at a server in communication with the vehicle via a network, and wherein the trajectory for the vehicle is sent to the vehicle via the network.

11. The method of claim 1, wherein the second machine learning model is deployed at the vehicle to determine, at the vehicle, the trajectory of the vehicle.

12. The method of claim 1, further comprising:
   applying the trained second machine learning model to determine, based at least on one or more images of an environment in which the vehicle is operating, the trajectory for the vehicle.

13. The method of claim 12, wherein the one or more images are generated using at least one of a camera and a microphone at the vehicle.

14. The method of claim 12, wherein the second machine learning model is further trained to determine the trajectory of the vehicle based on map data associated with the environment in which the vehicle is operating.

15. The method of claim 1, wherein the plurality of classes of objects comprising the dataset includes one or more stationary objects and mobile objects.

16. The method of claim 1, wherein the trajectory includes a sequence of actions navigated by the vehicle to travel from a first spatiotemporal location to a second spatiotemporal location.

17. A system, comprising:
   at least one processor; and
   at least one memory storing instructions, which when executed by the at least one processor, result in operations comprising:
   applying a first machine learning model trained to perform an open-set detection by at least identifying, based at least on image data indicative of one or more objects present in at least one environment in which one or more vehicles operate, at least one new class of objects;
   updating, using the at least one processor, a dataset comprising a plurality of classes of objects to comprise the at least one new class of objects identified by the first machine learning model; and
   training, using the at least one processor and based at least on the updated dataset comprising the at least one new class of objects identified by the first machine learning model, a second machine learning model to determine a trajectory for a vehicle.

18. The system of claim 17, wherein the first machine learning model further performs the open-set detection by at least:
   detecting at least one unknown object in the image data,
   extracting an embedding of each of the at least one unknown objects,
   clustering the embedding in a cluster with at least one other embedding that is consistent with the embedding, and
   identifying the cluster as a new class of objects if a threshold number of embeddings are in the cluster.

19. The system of claim 17, wherein the operations further comprise:
   annotating the at least one new class of objects by at least assigning a label to the at least one new class of objects.

20. The system of claim 19, wherein the label is determined automatically and/or based on one or more user inputs.

21. The system of claim 17, wherein the operations further comprise:
   training, using the at least one processor, the second machine learning model based on the dataset without the at least one new class of objects; and
   updating, using the at least one processor, the trained second machine learning model based on the dataset including the at least one new class of objects.

22. The system of claim 17, wherein the first machine learning model is trained to predict object attributes based on one or more of a location and a dimension.

23. The system of claim 22, wherein the dataset is updated to include at least one object attributed associated with the at least one new class of objects.

24. The system of claim 17, wherein the first machine learning model is an open set detector, and wherein the second machine learning model is a closed set detector.

25. The system of claim 17, wherein at least one of the first machine learning model and the second machine learning model is a multilayer perceptron, a convolutional neural network, a recurrent neural network, a transformer, and/or an autoencoder.

26. The system of claim 17, wherein the second machine learning model is deployed at a server in communication with the vehicle via a network, and wherein the trajectory for the vehicle is sent to the vehicle via the network.

27. The system of claim 17, wherein the second machine learning model is deployed at the vehicle to determine, at the vehicle, the trajectory of the vehicle.

28. The system of claim 17, wherein the operations further comprise:

applying the trained second machine learning model to determine, based at least on one or more images of an environment in which the vehicle is operating, the trajectory for the vehicle.

29. The system of claim 28, wherein the second machine learning model is further trained to determine the trajectory of the vehicle based on map data associated with the environment in which the vehicle is operating.

30. A non-transitory computer readable medium storing instructions, which when executed by at least one data processor, result in operations comprising:

applying a first machine learning model trained to perform an open-set detection by at least identifying, based at least on image data indicative of one or more objects present in at least one environment in which one or more vehicles operate, at least one new class of objects;

updating, using the at least one processor, a dataset comprising a plurality of classes of objects to comprise the at least one new class of objects identified by the first machine learning model; and training, using the at least one processor and based at least on the updated dataset comprising the at least one new class of objects identified by the first machine learning model, a second machine learning model to determine a trajectory for a vehicle.

\* \* \* \* \*